(12) United States Patent
Lee et al.

(10) Patent No.: US 10,128,490 B2
(45) Date of Patent: Nov. 13, 2018

(54) ANODE LAYER, LITHIUM SECONDARY BATTERY INCLUDING ANODE LAYER, AND METHOD OF MANUFACTURING ANODE LAYER

(71) Applicant: Samsung Electronics Co., Ltd., Suwon-si, Gyeonggi-do (KR)

(72) Inventors: Dongwook Lee, Suwon-si (KR); Hyeonjin Shin, Suwon-si (KR); Seongjun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 60 days.

(21) Appl. No.: 15/131,649

(22) Filed: Apr. 18, 2016

(65) Prior Publication Data
US 2016/0322628 A1    Nov. 3, 2016

(30) Foreign Application Priority Data
Apr. 29, 2015 (KR) .......................... 10-2015-0060722

(51) Int. Cl.
*H01M 4/134*  (2010.01)
*H01M 10/0525*  (2010.01)
(Continued)

(52) U.S. Cl.
CPC ......... *H01M 4/134* (2013.01); *H01M 4/0471* (2013.01); *H01M 4/1395* (2013.01); *H01M 4/386* (2013.01); *H01M 4/625* (2013.01); *H01M 4/661* (2013.01); *H01M 4/663* (2013.01); *H01M 4/667* (2013.01); *H01M 4/80* (2013.01); *H01M 10/052* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2009/0191466 A1* 7/2009 Bowden ................ H01M 4/581
429/337
2010/0176337 A1* 7/2010 Zhamu ................ H01M 4/1391
252/182.1
(Continued)

FOREIGN PATENT DOCUMENTS

| CN | 104 112 847 A | 10/2014 |
| KR | 2014-0134954 A | 11/2014 |
| KR | 2015-0000063 A | 1/2015 |

OTHER PUBLICATIONS https://energy.gov/eere/articles/how-does-lithium-ion-battery-work; Office of Energy Efficiency and Renewable Energy. (Year: 2017).*
(Continued)

*Primary Examiner* — Jonathan G Leong
*Assistant Examiner* — Christopher P Domone
(74) *Attorney, Agent, or Firm* — Harness, Dickey & Pierce, P.L.C.

(57) ABSTRACT

Example embodiments relate to an anode layer of a lithium secondary battery. The anode layer includes a three-dimensional carbon structure and a plurality of silicon particles. The three-dimensional carbon structure includes a plurality of cavities without a binder, and the plurality of silicon particles are disposed in the plurality of cavities.

18 Claims, 9 Drawing Sheets

(51) Int. Cl.
*H01M 4/1395* (2010.01)
*H01M 4/04* (2006.01)
*H01M 4/38* (2006.01)
*H01M 4/62* (2006.01)
*H01M 4/02* (2006.01)
*H01M 4/66* (2006.01)
*H01M 4/80* (2006.01)
*H01M 10/052* (2010.01)

(56) References Cited

U.S. PATENT DOCUMENTS

| | | | |
|---|---|---|---|
| 2012/0064409 A1 | 3/2012 | Zhamu et al. | |
| 2012/0100438 A1* | 4/2012 | Fasching | H01M 4/133 429/339 |
| 2012/0288750 A1* | 11/2012 | Kung | H01B 1/04 429/188 |

OTHER PUBLICATIONS

Nian Liu et al. "A Yolk-Shell Design for Stabilized and Scalable Li-Ion Battery Alloy Anodes". ACS Publication. Apr. 20, 2012, pp. A-G.

Hui Wu et al. "Engineering Empty Space between SI Nanoparticles for Lithium-Ion Battery Anodes". Nano Letters: ACS Publication. 2012. pp. 904-909.

Guangyu Zhao et al. "Decoration of graphene with silicon nanoparticles by covalent immobilization for use as anodes in high stability lithium ion batteries". Journal of Power Source. Elsevier B.V. 2013. pp. 212-218.

Xueyang Shen et al. "Si/mesoporous carbon composite as an anode material for lithium ion batteries". Journal of Alloys and Compounds. Elsevier B.V. 2013. pp. 60-64.

* cited by examiner

ANODE LAYER, LITHIUM SECONDARY BATTERY INCLUDING ANODE LAYER, AND METHOD OF MANUFACTURING ANODE LAYER

CROSS-REFERENCE TO RELATED APPLICATION

This application claims the benefit of priority from Korean Patent Application No. 10-2015-0060722, filed on Apr. 29, 2015, in the Korean Intellectual Property Office, the disclosure of which is incorporated herein in its entirety by reference.

BACKGROUND

1. Field

Example embodiments relate to anode layers, lithium secondary batteries including the anode layers, and/or methods of manufacturing the anode layers, and more particularly, to anode layers for improving battery life/lithium ion storage properties, lithium ion batteries including the anode layers, and/or methods of manufacturing the anode layers.

2. Description of the Related Art

Due to their high energy density and easy design, lithium secondary batteries have been used as the main power supply sources of mobile electronic devices for decades and their application range has been expanded to electric cars or power storage devices of new renewable energy. In order to meet such market requirements, increasing research has been conducted on the materials of lithium secondary batteries having higher energy density and long-life characteristics. In particular, research has been conducted on various anode materials such as carbon, silicon, tin, and germanium.

In particular, silicon materials have received increased attention because of about a 10 times higher gravimetric energy density and about a 2 times to about 3 times higher volumetric energy density than graphite materials. However, in the case of silicon-based materials, an electrode material may be damaged by the internal stress caused by an abrupt volume change occurring in a charge/discharge process. This may shorten the life of lithium secondary batteries.

SUMMARY

Example embodiments relate to anode layers for reducing or substantially preventing durability degradation, which may be caused by a silicon material volume change occurring in a charge/discharge process, even without including a binder, lithium secondary batteries including the anode layers, and methods of manufacturing the anode layers.

Additional example embodiments will be set forth in part in the description which follows and, in part, will be apparent from the description.

According to at least one example embodiment, a anode layer of a lithium secondary battery includes a three-dimensional carbon structure including a plurality of cavities without a binder, and a plurality of silicon particles disposed in the plurality of cavities.

The carbon structure may include at least one of graphene, a reduced graphene oxide, and graphite.

A volume of the silicon particle in the cavity may be about 30% to about 70% of a total volume of the cavity.

The silicon particle may have a size of about 5 nm to about 30 μm.

The anode layer may have a planar size of about 1 mm to about 1 m.

According to at least one example embodiment, a lithium secondary battery includes the above anode layer.

According to at least one example embodiment, a method of manufacturing a anode layer of a lithium secondary battery includes forming a pre-carbon structure including a plurality of first cavities without a binder and having a first opening for exposing the first cavity to an outside thereof, disposing a silicon particle in the first cavity through the first opening, and joining a carbon sheet to the pre-carbon structure to close the first opening.

The forming of the pre-carbon structure may include forming a polyimide structure having a plurality of second cavities having a second opening at one side thereof, inserting a first heat-resistant member into the plurality of second cavities and disposing a second heat-resistant member to surround an outside of the polyimide structure, heating the polyimide structure with the first and second heat-resistant members disposed thereat, and removing the first and second heat-resistant members.

The first and second heat-resistant members may include silicon carbide.

The heating of the polyimide structure may include heating the polyimide structure to about 2800° C. to about 3200° C.

The forming of the pre-carbon structure may include forming an aluminum structure having a plurality of third cavities having a third opening at one side thereof, spraying graphene oxide onto the third cavity of the aluminum structure, heating the graphene oxide to reduce the graphene oxide to graphene to form a pre-carbon structure on the aluminum structure, and removing the aluminum structure from the pre-carbon structure.

The joining of the carbon sheet to the pre-carbon structure may include applying heat or a microwave to the pre-carbon structure and the carbon sheet.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Figure 1A:
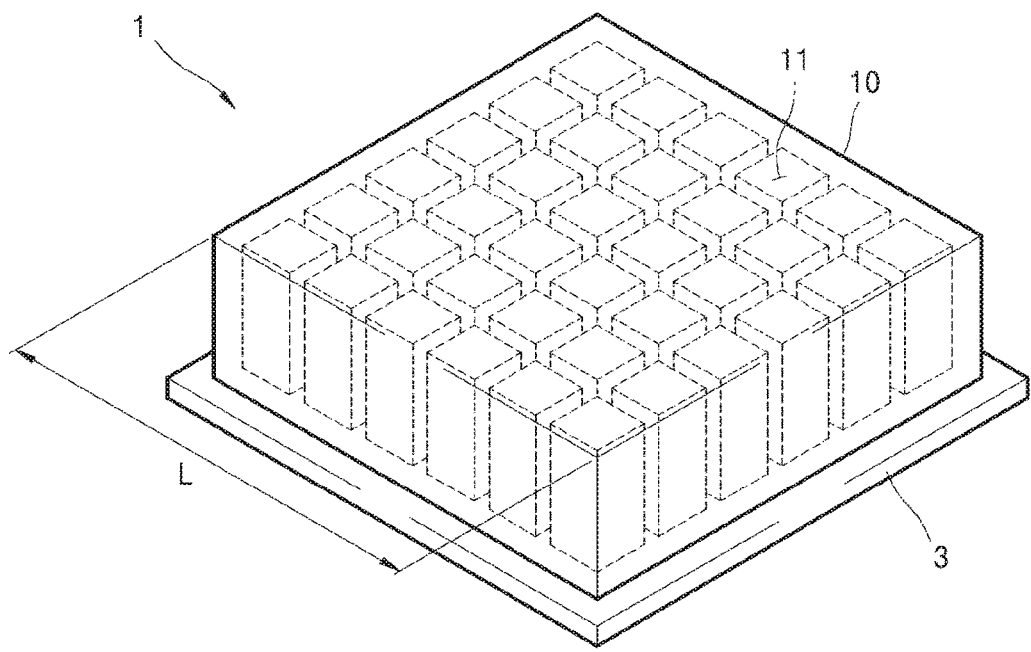
FIGS. 1A and 1B are a perspective view and a cross-sectional view, respectively, of a anode layer of a lithium secondary battery according to an example embodiment.

Reference will now be made in detail to example embodiments illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain various example embodiments. Hereinafter, anode layers, lithium ion batteries including the anode layers, and methods of manufacturing the anode layers according to example embodiments will be described with reference to the accompanying drawings. In the drawings, like reference numerals denote like elements, and the sizes and thicknesses of respective elements may be exaggerated for convenience of description. The embodiments described below are merely example, and various modifications may be made therein.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Figure 1B:
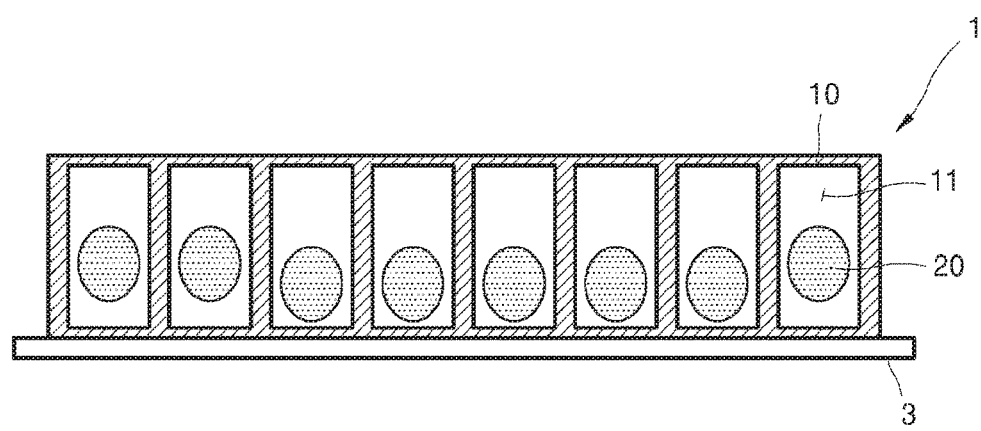

FIGS. 1A and 1B are a perspective view and a cross-sectional view, respectively, of a anode layer 1 of a lithium secondary battery, according to an example embodiment.

Referring to FIGS. 1A and 1B, the anode layer 1 of the lithium secondary battery is disposed on a anode collector 3. The anode collector 3 may include copper, nickel, stainless, titanium, or any combination thereof.

A size L of the anode layer 1 may be about 1 mm to about 1 m. Herein, the size L of the anode layer 1 may refer to the size of one side in a direction parallel to a plane of the anode collector 3. However, the name of the size L of the anode layer 1 may vary according to the shape of the anode layer 1. For example, when the anode layer 1 has a cylindrical shape, the size L of the anode layer 1 may also be referred to as a diameter thereof.

In at least one example embodiment, the anode layer 1 includes a carbon structure 10 and a plurality of silicon particles 20.

The carbon structure 10 may function as the anode layer 1 transferring electrons and may have a three-dimensional structure. The carbon structure 10 may include a plurality of cavities 11.

Figure 2:
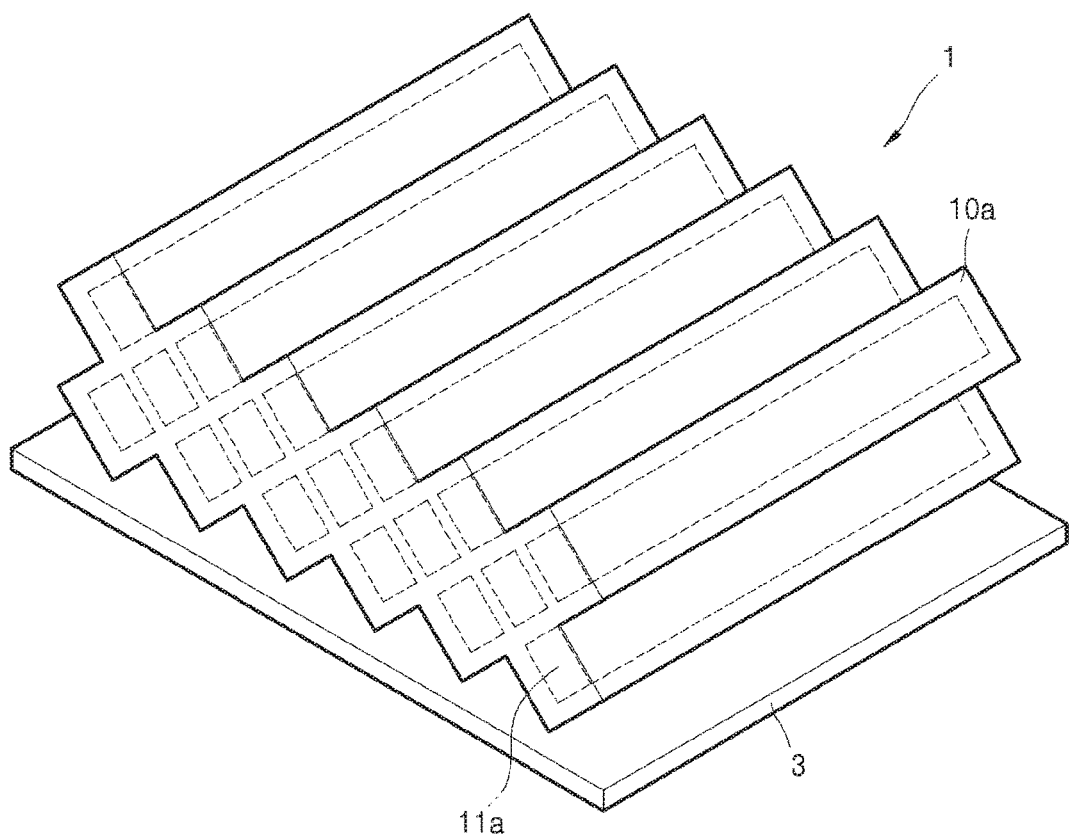
FIG. 2 is a perspective view of a anode layer of a lithium secondary battery according to another example embodiment.

In at least one example embodiment, one or more of the cavities 11 may have the shape of a rectangular parallelepiped, and may have the sectional shape of a tetragon. The extension direction of a cavity 11 may be perpendicular to the plane of the anode collector 3. However, the extension direction and shape of the cavity 11 may vary according to various example embodiments. For example, as illustrated in FIG. 2, when a carbon structure 10a has a corrugated shape, the extension direction of a cavity 11a may be parallel to the plane of the anode collector 3. Also, for example, the cavity 11 may have the shape of a pyramid or a diamond.

Referring to FIG. 1B, a silicon particle 20 may be disposed in at least some of the cavities 11. The size of the cavity 11 is larger than the size of the silicon particle 20. The volume of the cavity 11 is larger than the volume of the silicon particle 20.

The size of the silicon particle 20 may be about 5 nm to about 30 μm. The volume of the silicon particle 20 in the cavity 11 may be about 30% to about 70% of the total volume of the cavity 11. Herein, the size and volume of the silicon particle 20 may refer to the size and volume of the silicon particle 20 in a state where the lithium secondary battery is discharged, and may refer to the average size and volume of the silicon particles 20. The size of the silicon particle 20 may refer to the diametric or diagonal length depending on the shape of the silicon particle 20.

At least one silicon particle 20 may be disposed in the cavity 11. For example, one silicon particle 20 may be disposed in the cavity 11 as illustrated in FIG. 16, or a plurality of silicon particles 20 may be disposed in the cavity 11. Although it is illustrated that the same number of silicon particles 20 are disposed in each cavity 11, the inventive concepts are not limited thereto and different numbers of silicon particles 20 may be disposed in each cavity 11.

The operations or functions of the carbon structure 10 and the silicon particle 20 in the charge/discharge process of the lithium secondary battery will be described below, according to various example embodiments.

The silicon particle 20 may have a higher gravimetric energy density and a higher volumetric energy density than the carbon structure 10, for example, a graphite material. Accordingly, since the anode layer 1 includes the silicon particles 20, the gravimetric energy density and the volumetric energy density of the lithium secondary battery may be improved.

However, the silicon particle 20 may expand or contract in the charge/discharge process of the lithium secondary battery. The volume of the silicon particle 20 in the full-charge state may be about 140% to about 300% of the volume of the silicon particle 20 in the full-discharge state.

According to at least one example embodiment, since the silicon particle 20 having a variable volume is disposed in the cavity 11 of the carbon structure 10, any volume change of the silicon particle 20 may be substantially prevented from leading to a volume change of the overall anode layer 1. Accordingly, the durability degradation of the lithium secondary battery caused by the volume change of the anode layer 1 may be reduced or substantially prevented.

Figure 3A:
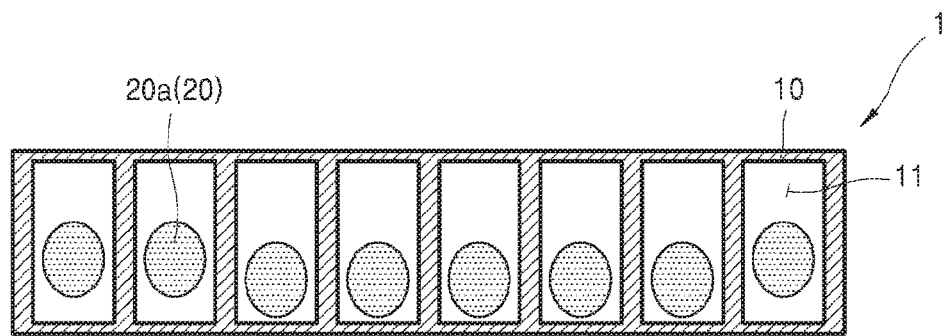
FIGS. 3A and 3B are schematic conceptual views illustrating a state where a lithium secondary battery, according to an example embodiment, is charged or discharged.

FIGS. 3A and 36 are schematic conceptual views illustrating a state where a lithium secondary battery according to an example embodiment is charged or discharged.

Referring to FIG. 3A, in the discharge state of the lithium secondary battery, the volume of a silicon particle 20a may be about 30% to about 70% of the total volume of the cavity 11. Accordingly, the empty space free of the silicon particle 20a in the cavity 11 may be conversely about 30% to about 70% of the total volume of the cavity 11.

Figure 3B:
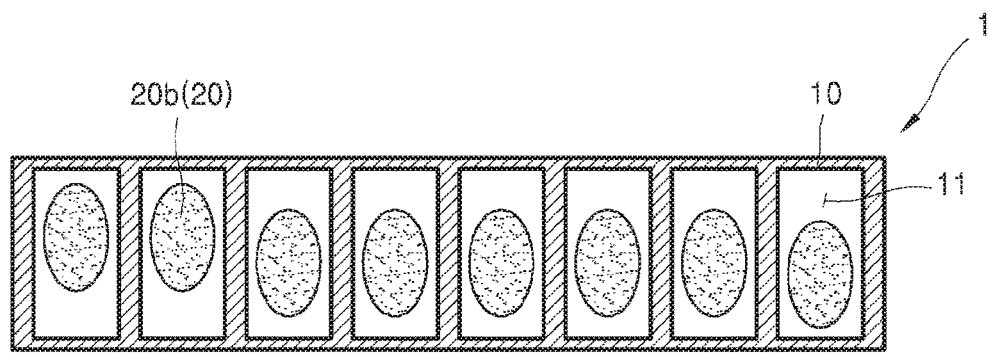

Referring to FIG. 3B, when the lithium secondary battery is charged, the silicon particle 20a is lithiated. Accordingly, a silicon particle 20b expands as a result. As an example, the volume of the silicon particle 20b in the full-charge state of the lithium secondary battery may be about 140% to about 300% of the volume of the silicon particle 20a in the uncharged-state of the lithium secondary battery.

As described above, when the lithium secondary battery is not charged, an empty space exists in the cavity 11. Therefore, even when the volume of the silicon particle 20 increases, the volume of the carbon structure 10 does not increase and thus the volume of the anode layer 1 does not increase.

Also, when the lithium secondary battery is discharged, the silicon particle 20b is delithiated, and thus the silicon particle 20a contracts as illustrated in FIG. 3A. According to at least one example embodiment, since the volume of the carbon structure 10 is not increased by the volume increase of the silicon particle 20, even when the silicon particle 20 contracts, the volume of the overall carbon structure 10 does not decrease and the volume of the overall anode layer 1 does not decrease.

That is, since the carbon structure 10 according to at least one example embodiment receives the silicon particle 20 in the cavity 11, the carbon structure 10 may substantially prevent a volume change of the anode layer 1 caused by the volume change of the silicon particle 20, in addition to functioning as an electrode of the anode layer 1.

Also, in the carbon structure 10, a plurality of silicon particles 20 may be uniformly arranged through a plurality of cavities 11. Thus, the gravimetric electric capacity of the lithium secondary battery may be easily controlled.

The carbon structure 10 may include a plurality of cavities 11 without including a binder. Herein, without including the binder may refer to excluding or removing the binder. For example, when the binder is included at about 1% or less of the total weight of the carbon structure 10, it may be considered that the carbon structure 10 does not include a binder.

As an example, the carbon structure 10 may include at least one of graphene, a reduced graphene oxide, and graphite without including a binder. A method of manufacturing the carbon structure 10 without including a binder will be described later.

By not including a binder, the carbon structure 10 may improve the performance of the anode layer 1.

Unlike the anode layer 1 according to at least one example embodiment, a general anode layer includes a binder in order to maintain its shape. A polyvinylidene fluoride (PVDF) or a polyacrylic acid (PAA) may typically be used as an example of the binder. The weight of the binder used in the anode layer may typically be about 30% to about 40% of the total weight of the anode layer.

However, since the carbon structure 10 according to the example embodiment does not include the binder, it may be reduced by the weight of the binder among the total weight of the anode layer 1. Accordingly, the gravimetric energy density of the lithium secondary battery may be improved.

Also, when the anode layer includes the binder, a side reaction between the binder and the lithium ions may occur. However, since the carbon structure 10 of the anode layer 1 according to the example embodiment does not include the binder, the side reaction caused by the binder may be reduced or substantially prevented.

Figure 4:
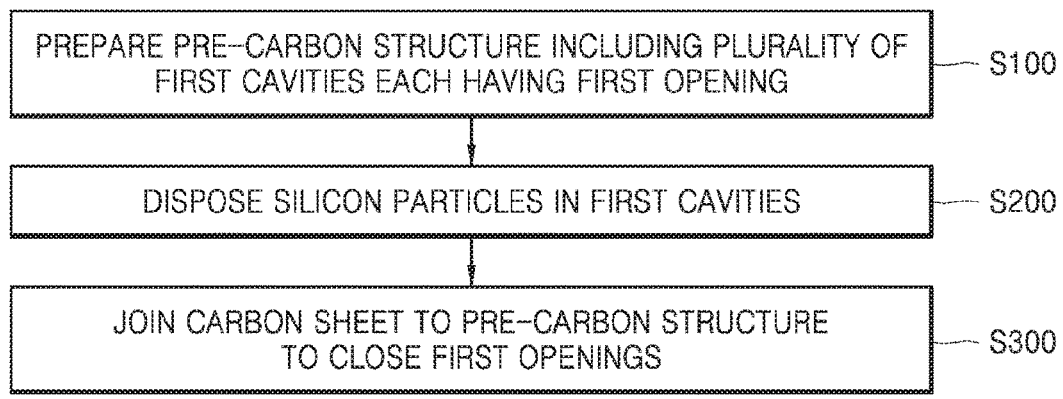
FIG. 4 is a flowchart illustrating a method of manufacturing a anode electrode of a lithium secondary battery, according to an example embodiment.

FIG. 4 is a flowchart illustrating a method of manufacturing a anode layer 1 of a lithium secondary battery, according to at least one example embodiment.

Referring to FIG. 4, a pre-carbon structure 10 having a three-dimensional structure without including a binder is formed or prepared (S100). A pre-carbon structure 110 (see FIG. 5D) may include a plurality of first cavities 111. The pre-carbon structure 110 is provided with a first opening 112 for exposing the first cavity 111 to an outside thereof.

The pre-carbon structure 110 may be formed as one body including a plurality of first cavities 111 without including a binder. For example, instead of each structure with the first cavity 111 being joined by a binder, the pre-carbon structure 110 may be formed as one body including a plurality of first cavities 111 without including a binder.

As an example, a polyimide structure 120 may be heat-treated to form the pre-carbon structure 110.

FIGS. 5A to 5D are conceptual views illustrating a method of forming a pre-carbon structure 110, according to at least one example embodiment. A method of heat-treating a polyimide structure 120 will be described with reference to FIGS. 5A to 5D.

Figure 5A:
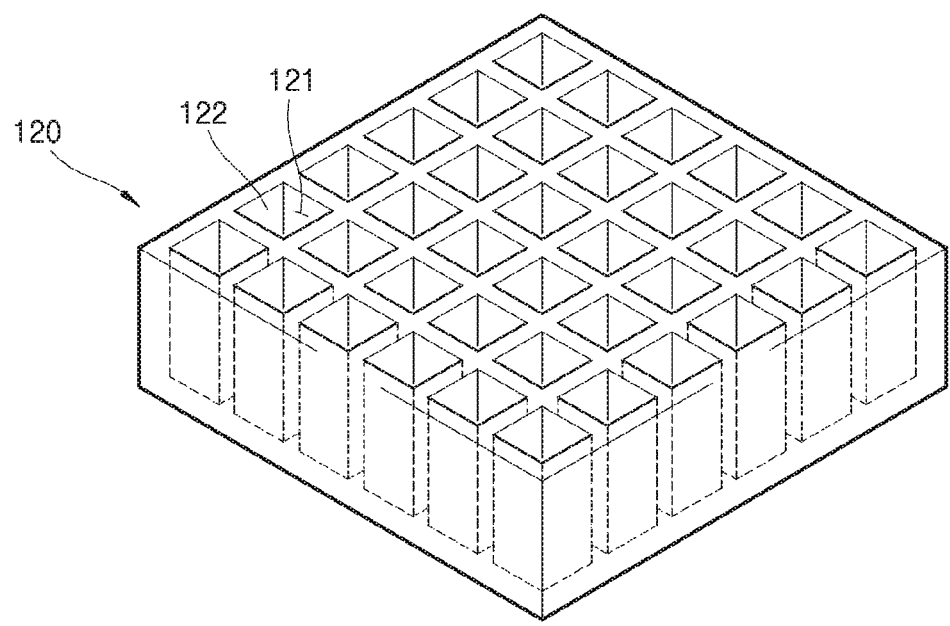
FIGS. 5A to 5D are conceptual views illustrating a method of forming a pre-carbon structure, according to an example embodiment.

Referring to FIG. 5A, a polyimide structure 120 is formed or prepared. The polyimide structure 120 includes a plurality of second cavities 121. The polyimide structure 120 is provided with a second opening 122 for exposing the second cavity 121 to an outside thereof. A detailed description of the method of forming the polyimide structure 120 will be omitted herein.

Figure 5B:
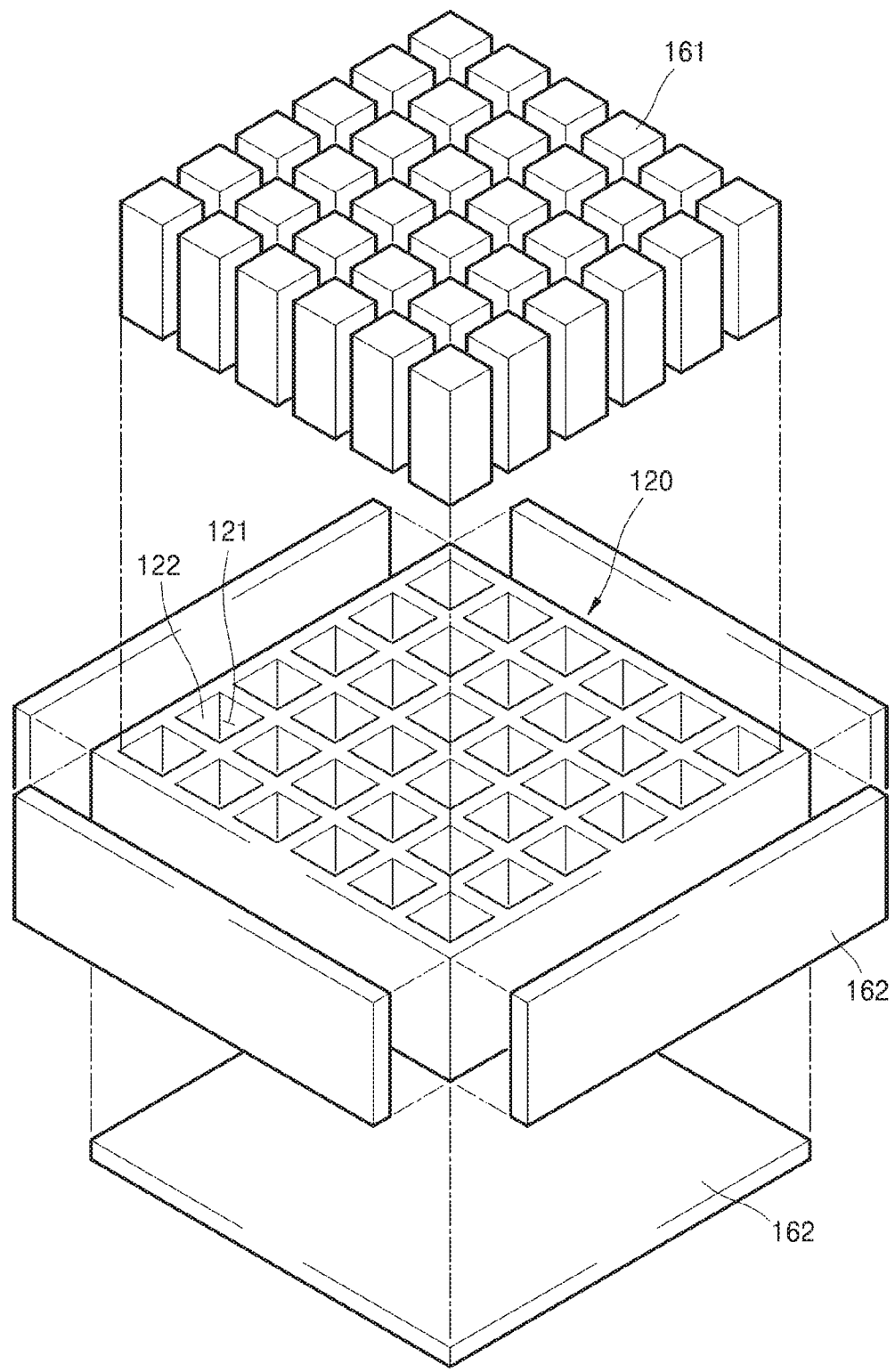

Referring to FIG. 5B, first and second heat-resistant members 161 and 162 are disposed at the polyimide structure 120. For example, the first heat-resistant member 161 is inserted into each of the second cavities 121 of the polyimide structure 120 through the second opening 122, and the second heat-resistant member 162 is disposed to surround the outside of the polyimide structure 120. The first and second heat-resistant members 161 and 162 may maintain their original shapes at a temperature of at least about 3000° C. For example, the first and second heat-resistant members 161 and 162 may include a silicon carbide (SiC).

Figure 5C:
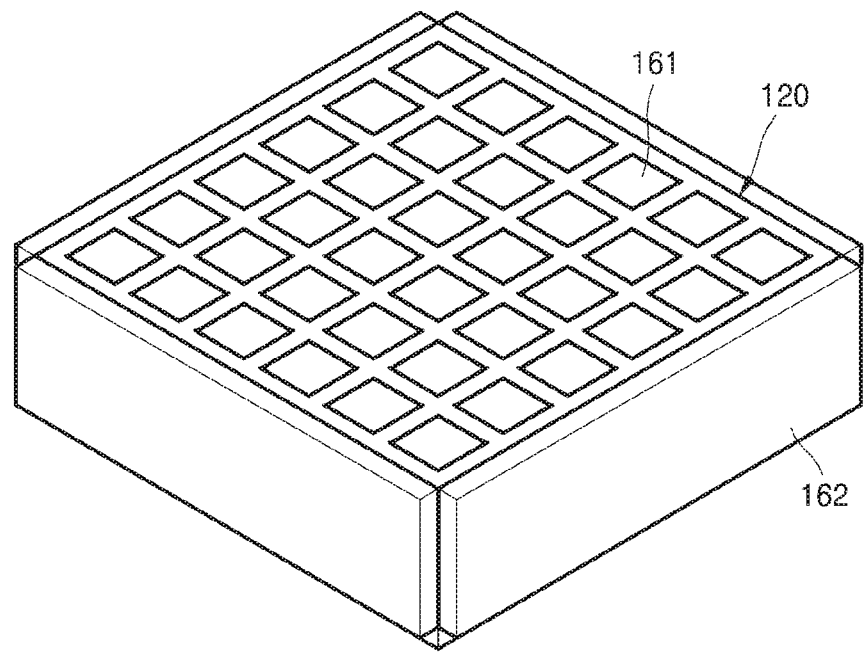

Referring to FIG. 5C, the polyimide structure 120 with the first and second heat-resistant members 161 and 162 disposed thereat is heated to a high temperature. For example, the polyimide structure 120 may be heated to a high temperature of about 2800° C. to about 3200° C.

During the high-temperature heating process, the material of the polyimide structure 120 may be converted into graphite, and the binder included in the polyimide structure 120 may be removed. During the heating process, the polyimide structure 120 may be converted into graphite while maintaining the unheated original shape by the first and second heat-resistant members 161 and 162.

Figure 5D:
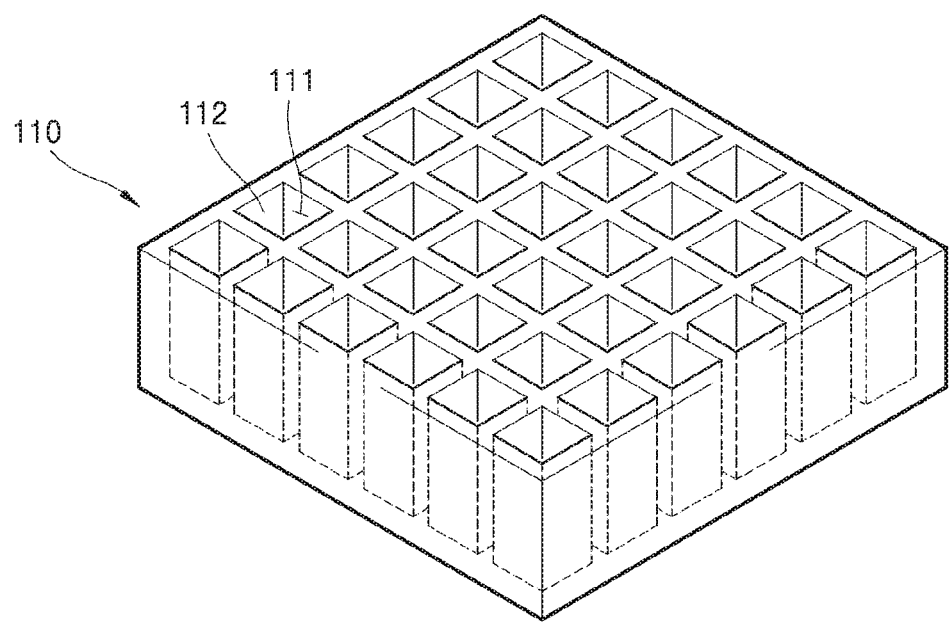

Referring to FIG. 5D, the first and second heat-resistant members 161 and 162 are removed from the polyimide structure 120 with the material converted into graphite. Thus, a pre-carbon structure 110 without including the binder and with the first cavity 111 exposed by the first opening 112 may be formed.

As another example, a graphene oxide 115 may be sprayed and formed on an aluminum structure 130 to form a pre-carbon structure 110a.

FIGS. 6A to 6D are conceptual views illustrating a method of manufacturing a pre-carbon structure 110a according to another example embodiment. A method of spraying and forming a graphene oxide 115 on an aluminum structure 130 will be described with reference to FIGS. 6A to 6D.

Figure 6A:
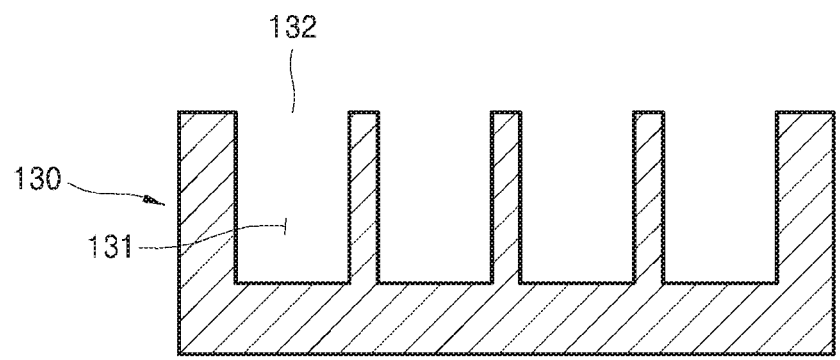
FIGS. 6A to 6D are conceptual views illustrating a method of manufacturing a pre-carbon structure, according to another example embodiment.

Referring to FIG. 6A, an aluminum structure 130 is formed or prepared. The aluminum structure 130 may include one or a plurality of third cavities 131. The aluminum structure 130 is provided with a third opening 132 for exposing the third cavity 131 to an outside thereof.

As an example, the aluminum structure 130 may include an anodic aluminum oxide that is formed by anodizing an aluminum plate in an acid electrolyte.

Figure 6B:
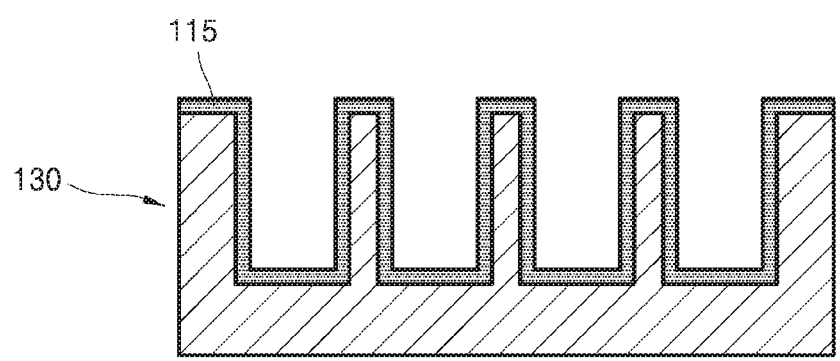

Referring to FIG. 6B, a graphene oxide 115 is sprayed onto the surface of the aluminum structure 130 where the third opening 132 is formed. Since the graphene oxide 115 has a higher dispersion than graphene, it may be coated along the surface shape of the aluminum structure 130.

Figure 6C:
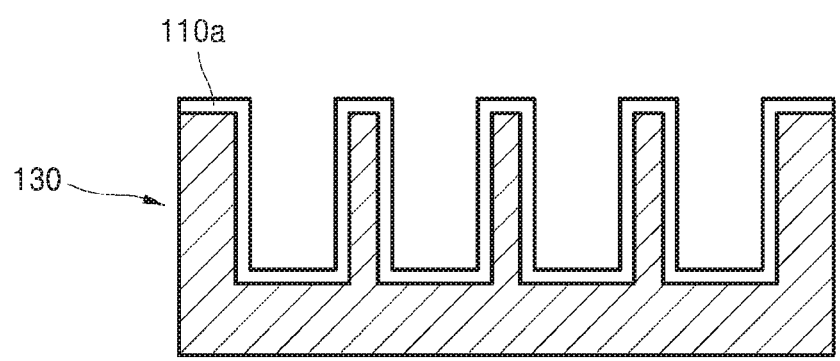

Referring to FIG. 6C, the graphene oxide 115 sprayed on the surface of the aluminum structure 130 is heated. For example, the graphene oxide 115 may be heated to a temperature of about 200° C. to about 500° C. Since the graphene oxide 115 is heated as above, the graphene oxide may be converted into a reduced graphene oxide without including a binder. Accordingly, a pre-carbon structure 110a including the reduced graphene oxide and corresponding to the surface shape of the aluminum structure 130 may be formed.

Figure 6D:
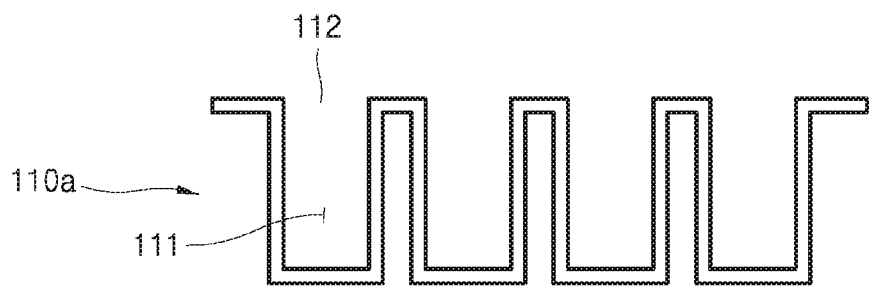

Referring to FIG. 6D, the aluminum structure 130 may be removed from the pre-carbon structure 110a. As an example, the aluminum structure 130 may be removed by etching. However, the inventive concepts are not limited thereto, and the aluminum structure 130 may be removed by various methods.

Through the above process, the pre-carbon structure 110a without binder and with a plurality of first cavities 111 having the first opening 112 formed thereat may be formed.

Figure 7A:
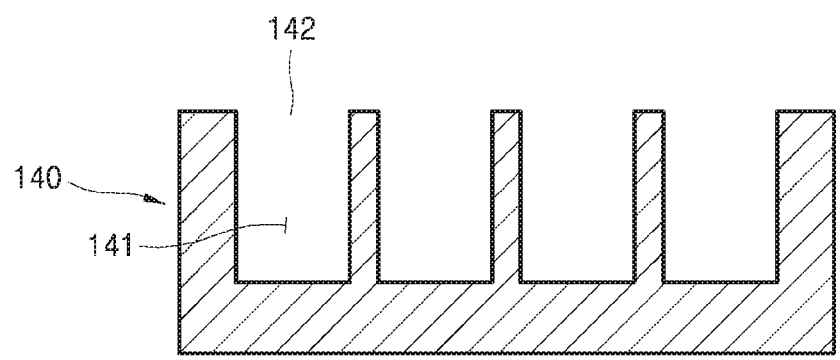
FIGS. 7A to 7C are conceptual views illustrating a method of manufacturing a pre-carbon structure, according to another example embodiment.
Figure 7B:
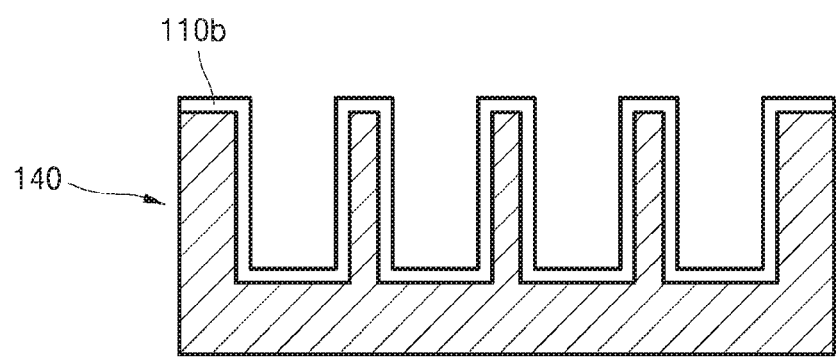

As another example, graphene may be formed by chemical vapor deposition (CVD) on a metal structure 140 to form a pre-carbon structure 110b, as illustrated in FIG. 7B.

Figure 7C:
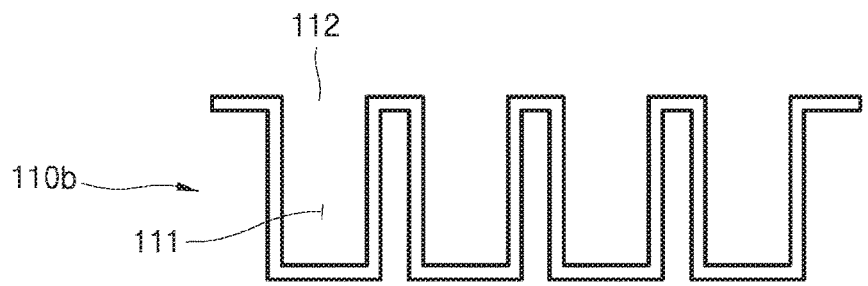

FIGS. 7A to 7C are conceptual views illustrating a method of manufacturing a pre-carbon structure 110b according to another example embodiment. A method of forming graphene on a metal structure 140 by CVD will be described with reference to FIGS. 7A to 7C.

Referring to FIG. 7A, a metal structure 140 including a plurality of fourth cavities 141 and provided with fourth openings 142 for exposing the fourth cavities 141 to an outside thereof is prepared or formed. The metal structure 140 may include a material such as copper or nickel that allows graphene to be formed by CVD.

Referring to FIG. 7B, graphene is deposited on the surface of the metal structure 140 by, for example, CVD. Accordingly, the pre-carbon structure 110b including the graphene on the surface of the metal structure 140 is formed.

Referring to FIG. 7C, by removing the metal structure 140, the pre-carbon structure 110b including the graphene and including the first cavity 111 having the first opening 112 formed thereat may be formed.

In addition, any method of forming the pre-carbon structure 110 having the first openings 112 provided at one side thereof may be used.

Referring back to FIG. 4, the silicon particle 20 is disposed in the first cavity 111 through the first opening 112 of the pre-carbon structure 110 (S200).

As an example of a method for disposing the silicon particle 20 in the first cavity 111, the silicon particle 20 may be inserted into the first cavity 111 in the form of powders. For example, a mask having a pattern corresponding to the first cavities 111 may be disposed on the pre-carbon structure 110, and the silicon particles 20 may be transferred along the top surface at a desired, or alternatively predetermined speed to insert the silicon particles 20 into the first cavities 111. However, the inventive concepts are not limited thereto, and the silicon particles 20 may be inserted by various methods.

As another example of the method for disposing the silicon particle 20 in the first cavity 111, the silicon particle 20 may be grown in the first cavity 111. For example, the silicon particle 20 may be formed in the first cavity 111 by CVD based on silane ($SiH_4$) gas.

Figure 8A:
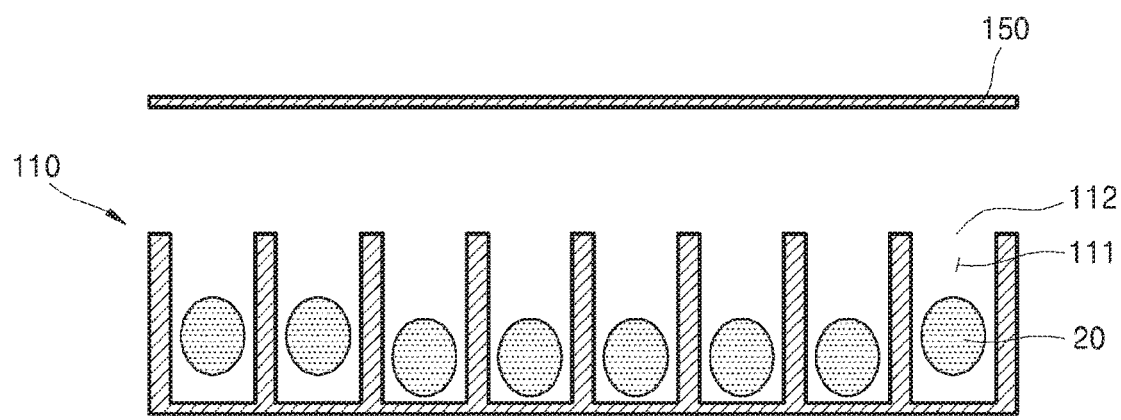
FIGS. 8A and 8B are conceptual views illustrating a method of joining a carbon sheet to a pre-carbon structure, according to an example embodiment.
Figure 8B:
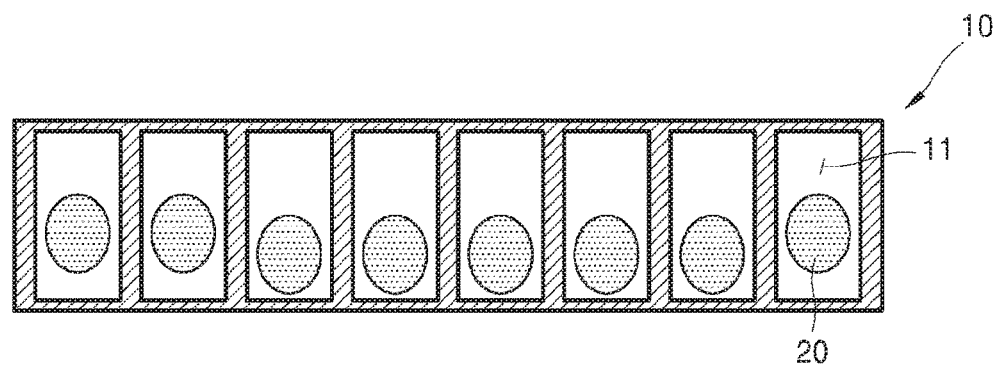

FIGS. 8A and 8B are conceptual views illustrating a method of joining a carbon sheet 150 to a pre-carbon structure 110, according to an example embodiment. Referring to FIGS. 4, 8A, and 8B, in a state where the silicon particle 20 is disposed in the first cavity 111, the carbon sheet 150 is disposed on the pre-carbon structure 110. Thereafter, the pre-carbon structure 110 and the carbon sheet 150 are joined together. The carbon sheet 150 may be a graphene sheet.

In order to join the pre-carbon structure 110 and the carbon sheet 150 together, heat or a microwave may be applied to a connection region between the pre-carbon structure 110 and the carbon sheet 150. The first opening 112 of the pre-carbon structure 110 is closed by the carbon sheet 150. Thus, the anode layer 1 having the silicon particles 20 disposed in the cavities 11 of the carbon structure 10 may be manufactured.

As described above, according to the anode layers, the lithium secondary batteries including the anode layers, and the methods of manufacturing the anode layers according to the example embodiments, since the silicon particles are disposed in the cavities of the carbon structure without including a binder, the durability degradation of lithium secondary batteries caused by the silicon particle volume change may be reduced or substantially prevented, and the energy density of lithium secondary batteries may be improved.

It should be understood that example embodiments described herein should be considered in a descriptive sense only and not for purposes of limitation. Descriptions of features within each example embodiment should typically be considered as available for other same or similar features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An anode layer of a lithium secondary battery, the anode layer comprising:
    a three-dimensional carbon structure including a plurality of cavities without a binder; and
    at least one silicon particle in at least one of the plurality of cavities;
    wherein at least one of the plurality of cavities includes an empty space; and
    a volume of the at least one of the plurality of cavities is larger than a volume of the at least one silicon particle so that a change in the volume of the at least one silicon particle does not cause a change in volume of the anode layer.

2. The anode layer of claim 1, wherein the carbon structure comprises at least one of graphene, a reduced graphene oxide, and graphite.

3. The anode layer of claim 1, wherein a volume of the at least one silicon particle in the at least one of the plurality of cavities is about 30% to about 70% of a total volume of the at least one of the plurality of cavities.

4. The anode layer of claim 1, wherein the at least one silicon particle has a size of about 5 nm to about 30 μm.

5. The anode layer of claim 1, wherein the anode layer has a planar size of about 1 mm to about 1 m.

6. A lithium secondary battery comprising an anode layer including:
    a three-dimensional carbon structure including a plurality of cavities without a binder; and
    at least one silicon particle in at least one of the plurality of cavities;
    wherein at least one of the plurality of cavities includes an empty space; and
    a volume of the at least one of the plurality of cavities is larger than a volume of the at least one silicon particle so that a change in the volume of the at least one silicon particle does not cause a change in volume of the anode layer.

7. The lithium secondary battery of claim 6, wherein the three-dimensional carbon structure comprises at least one of graphene, a reduced graphene oxide, and graphite.

8. The lithium secondary battery of claim 6, wherein a volume of the at least one silicon particle in the at least one of the plurality of cavities is about 30% to about 70% of a total volume of the at least one of the plurality of cavities.

9. The lithium secondary battery of claim 6, wherein the at least one silicon particle has a size of about 5 nm to about 30 μm.

10. The lithium secondary battery of claim 6, wherein the anode layer has a planar size of about 1 mm to about 1 m.

11. A method of manufacturing an anode layer of a lithium secondary battery, the method comprising:
    forming a pre-carbon structure including a plurality of first cavities without a binder, each of the plurality of first cavities having a first opening for exposing a corresponding one of the plurality of first cavities to an outside thereof;
    disposing at least one silicon particle in at least one of the plurality of first cavities through the first opening; and
    joining a carbon sheet to the pre-carbon structure to close the first opening of the at least one of the plurality of first cavities;
    wherein the at least one of the plurality of first cavities includes an empty space; and a volume of the at least one of the plurality of first cavities is larger than a volume of the at least one silicon particle so that a change in the volume of the at least one silicon particle does not cause a change in volume of the anode layer.

12. The method of claim 11, wherein the forming of the pre-carbon structure comprises:
forming a polyimide structure having a plurality of second cavities, each of the plurality of second cavities having a second opening at one side thereof;
inserting a first heat-resistant member into the plurality of second cavities and disposing a second heat-resistant member to surround the polyimide structure;
heating the polyimide structure with the first and second heat-resistant members disposed thereat; and
removing the first and second heat-resistant members.

13. The method of claim 12, wherein the first and second heat-resistant members comprise a silicon carbide.

14. The method of claim 12, wherein the heating of the polyimide structure comprises heating the polyimide structure from about 2800° C. to about 3200° C.

15. The method of claim 11, wherein the forming of the pre-carbon structure comprises:
forming an aluminum structure having a plurality of third cavities, each of the plurality of third cavities having a third opening at one side thereof;
spraying a graphene oxide onto at least one of the third cavities of the aluminum structure;
heating the graphene oxide to reduce the graphene oxide to graphene and to form a pre-carbon structure on the aluminum structure; and
removing the aluminum structure from the pre-carbon structure.

16. The method of claim 11, wherein the joining of the carbon sheet to the pre-carbon structure comprises applying heat or a microwave to the pre-carbon structure and the carbon sheet.

17. The anode layer of claim 1, wherein the plurality of cavities are regularly spaced.

18. The lithium secondary battery of claim 6, wherein the plurality of cavities are regularly spaced.

* * * * *